United States Patent
Benz et al.

(10) Patent No.: US 7,051,518 B2
(45) Date of Patent: May 30, 2006

(54) INTERNAL COMBUSTION ENGINE FUEL SUPPLY SYSTEM

(75) Inventors: Uwe Benz, Oberuhldingen (DE); Guenther Dietrich, Daisendorf (DE); Detlef zur Megede, Kirchheim (DE)

(73) Assignee: NuCellSys GmbH, Kirchheim (DE)

( * ) Notice: Subject to any disclaimer, the term of this patent is extended or adjusted under 35 U.S.C. 154(b) by 0 days.

(21) Appl. No.: 11/178,223

(22) Filed: Jul. 7, 2005

(65) Prior Publication Data

US 2006/0059897 A1 Mar. 23, 2006

Related U.S. Application Data

(63) Continuation of application No. 10/484,458, filed as application No. PCT/EP02/08098 on Jul. 19, 2002, now abandoned.

(30) Foreign Application Priority Data

Jul. 21, 2001 (DE) .............................. 101 35 643

(51) Int. Cl.
*F01N 3/00* (2006.01)
(52) U.S. Cl. ............................ 60/286; 60/288; 60/295; 60/298; 60/301; 60/303; 60/320
(58) Field of Classification Search ................. 60/286, 60/287, 288, 295, 298, 301, 303, 320; 123/1 A, 123/3
See application file for complete search history.

(56) References Cited

U.S. PATENT DOCUMENTS

| | | | | |
|---|---|---|---|---|
| 3,779,014 A * | 12/1973 | Nohira et al. | ................. | 60/286 |
| 3,842,600 A * | 10/1974 | Nakajima et al. | ............. | 60/286 |
| 3,986,350 A * | 10/1976 | Schmidt | ...................... | 60/286 |
| 4,033,133 A * | 7/1977 | Houseman et al. | ........... | 60/606 |
| 4,086,877 A * | 5/1978 | Henkel et al. | ............... | 123/1 A |
| 5,263,318 A * | 11/1993 | Oota et al. | ..................... | 60/286 |
| 5,272,871 A * | 12/1993 | Oshima et al. | ............... | 60/286 |
| 5,412,946 A * | 5/1995 | Oshima et al. | ............... | 60/286 |
| 5,419,121 A * | 5/1995 | Sung et al. | ................... | 60/274 |
| 5,894,728 A * | 4/1999 | Wakamoto | ................... | 60/286 |
| 5,953,908 A * | 9/1999 | Appleby | ....................... | 60/275 |
| 5,964,089 A * | 10/1999 | Murphy et al. | ............... | 60/286 |
| 6,155,212 A * | 12/2000 | McAlister | ....................... | 123/3 |
| 6,260,353 B1 * | 7/2001 | Takahashi | ..................... | 60/286 |
| 6,427,639 B1 * | 8/2002 | Andrews et al. | ............... | 123/3 |

* cited by examiner

*Primary Examiner*—Thomas Denion
*Assistant Examiner*—Diem Tran
(74) *Attorney, Agent, or Firm*—Crowell & Moring LLP

(57) ABSTRACT

A system to supply hydrogen-rich fuel to an internal combustion engine, whereby a hydrogen-rich gas is produced from a liquid raw fuel by a hydrogen generator. The exhaust line of the internal combustion engine contains an exhaust purification system, such as a DeNOx catalytic converter, which is at least temporarily supplied with hydrogen-rich gas through a bypass line. In addition, the exhaust line is in thermal contact with the hydrogen generator in order to recover thermal energy.

7 Claims, 1 Drawing Sheet

INTERNAL COMBUSTION ENGINE FUEL SUPPLY SYSTEM

CROSS-REFERENCES TO RELATED APPLICATIONS

Figure 1:
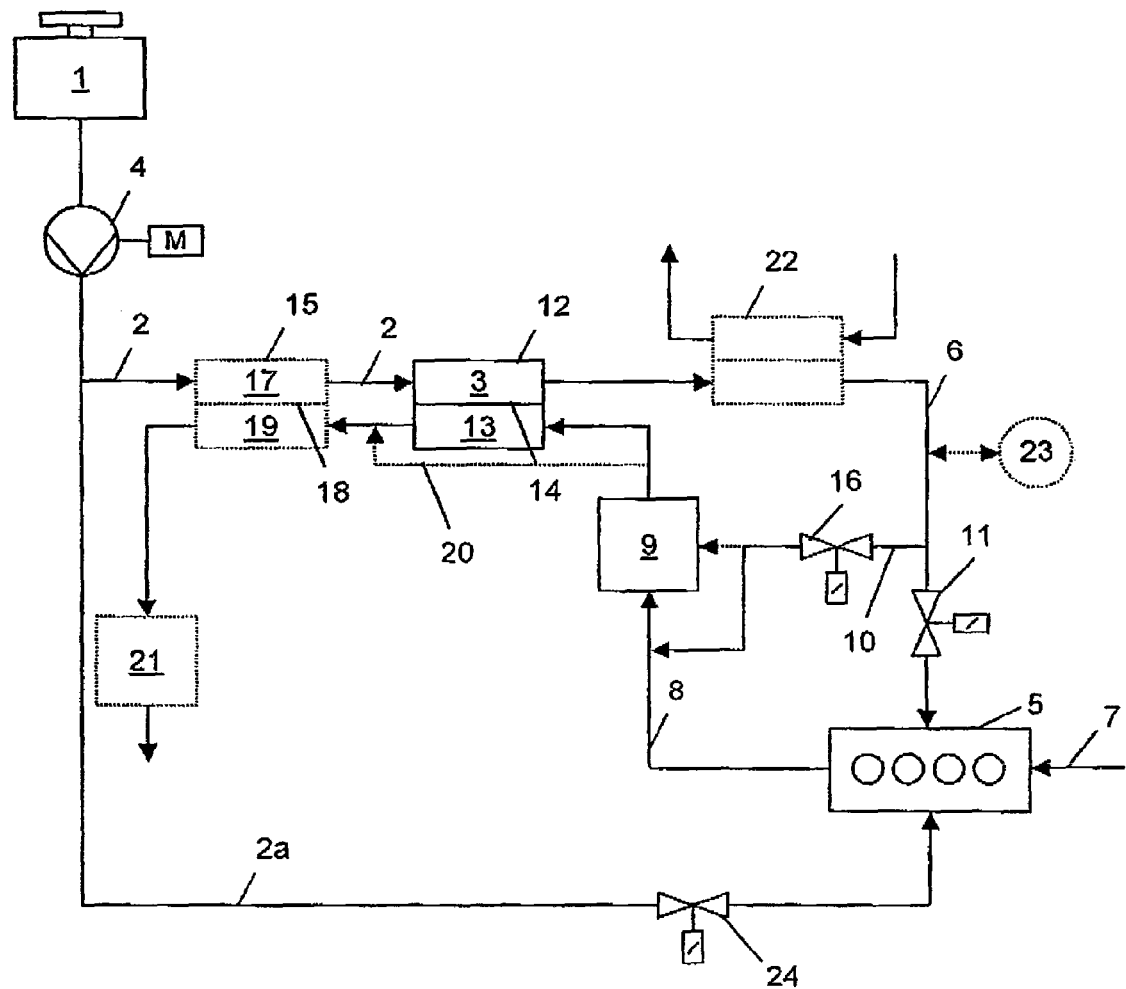

This application is a continuation of U.S. patent application Ser. No. 10/484,458, filed Jan. 21, 2005, now abandoned, which is a U.S. National Stage application of PCT/EP02/08098 filed Jul. 19, 2002, which claims priority to German Application No. 101 35 643.9, filed Jul. 21, 2001; all of these applications are incorporated herein by reference in their entireties.

FIELD OF THE INVENTION

The invention concerns a system for supplying fuel to an internal combustion engine.

DESCRIPTION OF THE RELATED ART

A goal in the development of motor vehicles with internal combustion engines today is the reduction of fuel consumption and carbon dioxide emissions. It is also desired to reduce other pollutants in the exhaust, in particular nitrogen oxides (NOx).

Motor vehicles with cracking carburetors, in which hydrocarbon fuels are converted by a partial oxidation device prior to entering the internal combustion engine, are well known. However, this conversion process typically requires temperatures over 800° C., resulting in the formation of soot particulates. In addition, the exothermic nature of the reaction leads to an energy loss during the chemical conversion.

DeNOx (nitrogen oxide removal) catalytic converters, which reduce nitrogen oxides in the exhaust by converting the nitrogen oxides to nitrogen with a suitable catalyst and reducing agents, are known. In this regard, it is well known to produce hydrogen and carbon monoxide on-board the vehicle from hydrocarbons or urea. The use of urea requires a separate urea tank.

There remains a need to reduce the fuel consumption and emissions of internal combustion engines.

BRIEF SUMMARY OF THE INVENTION

The present system includes a hydrogen generator to produce a hydrogen-rich fuel for combustion in an internal combustion engine. The hydrogen-rich fuel may also be used in a downstream DeNOx catalytic converter to reduce the NOx content of the engine exhaust. Heat is recovered from the exhaust stream and supplied to the hydrogen generator to support the endothermic conversion of raw fuel to the hydrogen-rich fuel.

Using endothermic reactions during the production of hydrogen-rich fuel increases the calorific value of the reactants by the amount of energy recovered from the engine exhaust. This leads to a correspondingly higher overall efficiency of the whole system, which goes hand in hand with a reduction in carbon monoxide emissions.

Hydrogen-rich fuel produced by endothermic steam reforming in addition to being suitable for combustion in the internal combustion engine, is particularly useful as a reducing agent in a DeNOx catalytic converter. The increased nitrogen output, which in the case of methanol—due to the high purity of the fuel—predominantly consists of thermal nitrogen oxides, can be reduced by a DeNOx catalytic converter in combination with the use of the produced hydrogen-rich fuel as a reducing agent. This makes it possible to increase the combustion temperature, and thus the efficiency, of the internal combustion engine.

In addition to conventional fuels, such as gasoline and diesel, alternative fuels, such as methanol, dimethyl ether ("DME"), or ethanol, are suitable for use. Methanol in particular, but also DME, can be converted to a hydrogen-rich fuel at low temperatures. The hydrogen-rich fuel is predominantly composed of hydrogen, carbon monoxide, and possibly some unconverted fuel. The low temperatures simplify the selection of the raw fuel and promote the recovery of thermal energy from the engine exhaust. When using methanol, for example, an energy recovery rate of approximately 20% can be achieved using the engine exhaust alone. For conversion of hydrocarbon fuels, similar amounts of energy have to be transferred at significantly higher temperatures, so that the energy content and the temperature level are potentially only sufficient to partially convert the fuel.

Particularly in the case of methanol, but also for DME, no soot particulates, or only very small quantities, are produced during the conversion. Similarly, the combustion of the resultant mixtures of hydrogen and carbon monoxide, and possibly unconverted fuel constituents, in the internal combustion engine does not create any problems with respect to the formation of pollutants, including soot particulates. This system is a gas engine, with all the well-known advantages related to mixture formation and combustion. Furthermore, methanol and DME are very pure substances, so that the combustion and the exhaust purification are not contaminated by other unwanted substances, such as sulphur.

All of the listed fuels can be generated from natural gas, or as a renewable resource, from biomass. This contributes to the long-term reduction of global carbon dioxide levels. In particular alcohols and DME produce less carbon dioxide, simply due to their lower carbon content per unit of energy released.

The corrosive properties of the raw fuels are not a problem in the internal combustion engine since the conversion into hydrogen and carbon monoxide takes place under conditions that are entirely different from those of combustion in an internal combustion engine. Moreover, hydrogen and carbon dioxide are not corrosive.

Possible disadvantages of the hydrogen generator during a cold-start or load changes can be avoided by directly combusting the raw fuels in the internal combustion engine when these conditions arise.

These and other aspects will be evident upon reference to the attached FIGURE and following detailed description.

BRIEF DESCRIPTION OF THE DRAWING(S)

FIG. 1 is a schematic diagram of an embodiment of the present system for supplying fuel to an internal combustion engine.

DETAILED DESCRIPTION OF THE INVENTION

Raw fuel, preferably in liquid form, is carried in a vehicle in a tank 1, and is fed to a hydrogen generator 3 (e.g. a reformer) by a raw fuel feed line 2. Raw fuel feed line 2 contains a pump 4, which pumps and possibly meters the raw fuel. In hydrogen generator 3, an endothermic reaction converts the raw fuel into a gaseous hydrogen-rich fuel, which is then supplied to an internal combustion engine 5 through a hydrogen-rich fuel feed line 6. To regulate the amount of hydrogen-rich fuel supplied, the hydrogen-rich fuel feed line is equipped with a first valve 11. Air required for combustion is supplied to internal combustion engine 5 through an intake line 7. After combustion, the exhaust is discharged through an exhaust line 8.

Exhaust line 8 contains an exhaust purification system 9, preferably a DeNOx catalytic converter, in which nitrogen oxides contained in the exhaust are reduced to nitrogen using reducing agents present in the exhaust.

To supply or to increase the amount of the reducing agents in the exhaust, a hydrogen-rich fuel bypass line 10 is disposed to connect hydrogen-rich fuel feed line 6 to exhaust line 8, upstream of exhaust purification system 9. The hydrogen-rich fuel from fuel feed line 6 is allowed to mix with the exhaust in line 8 upstream of exhaust purification system 9. Alternatively, hydrogen-rich fuel bypass line 10 may directly lead into exhaust purification system 9. In addition, hydrogen-rich fuel bypass line 10 contains a second valve 16, to adjust the quantity of hydrogen-rich fuel to be supplied to exhaust purification system 9

Since the reaction that takes place in the hydrogen generator is an endothermic reaction, it is necessary to heat hydrogen generator 3, and accordingly, hydrogen generator 3 in the representative embodiment illustrated in FIG. 1 is integrated into a heat exchanger 12. Heat exchanger 12 includes a heating chamber 13, which is in thermal contact with hydrogen generator 3 through a separating wall 14. Heating chamber 13 is integrated into exhaust line 8 downstream of exhaust purification system 9, so that exhaust passes through heating chamber 13, transferring thermal energy from the exhaust to the reaction zone of hydrogen generator 3. After passing through heating chamber 13, the exhaust may be discharged to the surroundings.

In addition to the embodiment illustrated in FIG. 1, other configurations are possible to transfer thermal energy from the exhaust to hydrogen generator 3. For example, a heat exchanger may be included in raw fuel feed line 2, upstream of hydrogen generator 3, so that the transferred thermal energy is introduced into hydrogen generator 3 by the reactants. It is also possible to interpose an additional heat-exchanging medium so heat is transferred indirectly to the raw fuel.

Typically, the liquid raw fuel is evaporated and possibly superheated in an evaporator 15 before entering hydrogen generator 3. For this purpose, evaporator 15 may be configured analogously to heat exchanger 12, whereby an evaporation chamber 17 is in thermal contact with a heating chamber 19 through a separating wall 18. Exhaust flows through heating chamber 19, which is integrated in exhaust line 8. The exhaust may pass through heating chambers 13 and 19 of heat exchangers 12 and 15 in series. Alternatively, a bypass line 20 may branch off exhaust line 8 upstream of heat exchanger 12, and may rejoin exhaust line 8 between the heat exchangers 12 and 15. In this case, the flow passes through heat exchangers 12 and 15 at least partially in parallel. Alternatively, the flow may be directed through heat exchangers 12 and 15 entirely in parallel. In this case, the heating chamber associated with hydrogen generator 3 is integrated in exhaust line 8, while heating chamber 19 associated with evaporation chamber 17 is arranged in bypass line 20, and bypass line 20 joins exhaust line 8 downstream of evaporator 15.

Alternatively, part of the thermal energy required for evaporating the raw fuel and/or the water may be obtained from the cooling system of internal combustion engine 5.

In an alternative embodiment (not shown), depending on the desired temperature level, exhaust purification system 9 can also be located in exhaust line 8 downstream of heat exchanger 12 and/or heat exchanger 15.

In still another embodiment, a sound absorber 21 may be disposed in exhaust line 8. Furthermore, hydrogen-rich fuel feed line 6 may contain a further heat exchanger 22, which is charged with a cooling medium to cool the hydrogen-rich fuel issuing from hydrogen generator 3. Finally, a storage container 23 for hydrogen-rich fuel may be provided, which is connected to hydrogen-rich fuel feed line 6. Preferably, storage container 23 is connected to hydrogen-rich fuel feed line 6 downstream of heat exchanger 22, so that only cooled hydrogen-rich fuel is supplied into the storage container 23, thereby increasing the storage capacity of storage container 23.

The pressure in hydrogen-rich fuel feed line 6 usually is only slightly higher than ambient pressure. To improve the dynamic behaviour and to improve the dosing, the pressure may be at a slightly higher level, preferably at an excess pressure of between 1 to 10 bar.

In a further embodiment, internal combustion engine 5 may be connected with tank 1 by an additional raw fuel feed line 2a, so that liquid raw fuel can be directly supplied to internal combustion engine 5. In this case, in the event of rapid load changes and/or during a cold start, part or all of the fuel provided directly to internal combustion engine 5 can be liquid raw fuel. For this purpose, a third valve 24 is arranged in raw fuel feed line 2a.

Typical fuels include alcohols or other fuels that can be cracked catalytically or thermally, such as methanol, dimethyl ether, ethanol, gasoline, and diesel.

Depending on the fuel employed, various material conversion processes can take place in hydrogen generator 3. In the case of methanol, these are:

Pyrolysis:

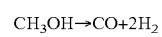
$$CH_3OH \rightarrow CO + 2H_2$$

Steam reforming:

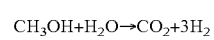
$$CH_3OH + H_2O \rightarrow CO_2 + 3H_2$$

Both reactions preferably take place on conventional copper catalysts at temperatures above 200° C. and with a heat input of approximately 4000 kJ/kg. Steam reforming has the advantage that the formation of soot particulates is suppressed. Further, hydrogen and carbon dioxide are produced as hydrogen-rich fuel, but only small amounts of toxic carbon monoxide are formed. The methanol can be evaporated together with the water in evaporator 15, which suppresses coking of evaporator 15. One disadvantage of steam reforming is the higher evaporation energy requirement, which is due to the fact that a larger, more expensive, device is needed. Moreover, if the water is to be carried along in the tank, the dimensions of the tank need to be larger. As an alternative, the water can be reclaimed from the exhaust. However, this technology is technically complicated and thus expensive. If a combination of pyrolysis and steam reforming is used, the overall process can be optimized with respect to tank size, evaporation energy requirements and the endothermic conversion, size of the required equipment, and the required energy content and temperature of the exhaust.

If ethanol is used, which has a higher calorific value than methanol, the reactions are:

Pyrolysis:

$$C_2H_5OH \rightarrow CO + 3H_2 + C$$

Steam reforming:

$$C_2H_5OH + H_2O \rightarrow 2CO + 4H_2$$

Both reactions take place at temperatures above 500° C. Again, an advantage of steam reforming is the lower risk of forming soot particulates. Evaporating ethanol and water together can reduce coking of the evaporator. An increased supply of water can further reduce particulate formation and at the same time helps to convert part of the carbon monoxide into carbon dioxide and hydrogen in a shift reaction. The disadvantages of steam reforming are the same for methanol and ethanol, and are discussed above.

If a fuel such as dimethyl ether (DME) is used, the fact that it is gaseous under normal ambient conditions must be taken into account. However, DME liquefies at low pressure and accordingly may be carried as a liquid in a pressure tank at comparatively low pressure.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system for supplying fuel to both an internal combustion engine and an exhaust purification system disposed in an exhaust line of said internal combustion engine, the system comprising:
    a tank to store raw fuel;
    a hydrogen generator to convert the raw fuel to a gaseous hydrogen-rich fuel;
    a raw fuel feed line between the tank and the hydrogen generator;
    a pump disposed in the raw fuel feed line;
    a hydrogen-rich fuel feed line between the hydrogen generator and the internal combustion engine;
    a hydrogen-rich fuel bypass line configured to connect the hydrogen-rich fuel feed line to one of the exhaust purification system and the exhaust line upstream of the exhaust purification systems; and
    a valve disposed within the hydrogen-rich fuel bypass line; wherein,
    the hydrogen generator is in thermal contact with the exhaust line;
    the system further comprises an evaporator disposed in the raw fuel feed line between the pump and the hydrogen generator;
    the evaporator is in thermal contact with the exhaust line;
    the exhaust line comprises a main exhaust line that includes the exhaust purification system, and is in thermal contact with the hydrogen generator and an exhaust bypass line;
    the exhaust bypass line branches off the main exhaust line upstream of the hydrogen generator and rejoins the main exhaust line between the hydrogen generator and the evaporator; and
    the exhaust bypass line is coupled to supply exhaust flowing through the exhaust bypass line to the evaporator.

2. The system of claim 1, wherein the evaporator is in thermal contact with the exhaust line downstream of the hydrogen generator, relative to a flow direction of the exhaust.

3. The system of claim 1, wherein:
    the internal combustion engine has a cooling system; and
    the evaporator is in thermal contact with the cooling system.

4. The system of claim 1, further comprising a heat exchanger disposed in the hydrogen-rich fuel feed line.

5. The system of claim 1, further comprising a storage container connected to the hydrogen-rich fuel feed line.

6. The system of claim 1, further comprising a raw fuel feed line between the tank and the internal combustion engine.

7. The system of claim 1 wherein the exhaust purification system comprises a DeNOx catalytic converter.

* * * * *